United States Patent
Tigner et al.

(12) United States Patent (10) Patent No.: US 12,377,975 B2
(45) Date of Patent: Aug. 5, 2025

(54) AIRCRAFT COMPONENT LONGEVITY

(71) Applicant: Archer Aviation Inc., San Jose, CA (US)

(72) Inventors: Benjamin Tigner, Laguna Beach, CA (US); James Orbon, Newport Beach, CA (US)

(73) Assignee: Archer Aviation Inc., San Jose, CA (US)

( * ) Notice: Subject to any disclaimer, the term of this patent is extended or adjusted under 35 U.S.C. 154(b) by 233 days.

(21) Appl. No.: 18/018,116

(22) PCT Filed: Jul. 28, 2021

(86) PCT No.: PCT/US2021/043404
§ 371 (c)(1),
(2) Date: Jan. 26, 2023

(87) PCT Pub. No.: WO2022/026518
PCT Pub. Date: Feb. 3, 2022

(65) Prior Publication Data
US 2023/0271713 A1    Aug. 31, 2023

Related U.S. Application Data

(60) Provisional application No. 63/057,613, filed on Jul. 28, 2020.

(51) Int. Cl.
*B64D 31/06*    (2024.01)
*B64C 11/44*    (2006.01)
(Continued)

(52) U.S. Cl.
CPC .............. *B64D 31/06* (2013.01); *B64C 11/44* (2013.01); *B64C 29/0033* (2013.01); *B64D 27/24* (2013.01); *B64D 2045/0085* (2013.01)

(58) Field of Classification Search
CPC ................... B64D 31/06; B64D 27/24; B64D 2045/0085; B64C 11/44; B64C 29/0033
See application file for complete search history.

(56) References Cited

U.S. PATENT DOCUMENTS

2002/0187041 A1* 12/2002 Arnold .................. B64C 27/605
416/25
2009/0205404 A1* 8/2009 Swadling .............. G01M 13/04
73/7

(Continued)

FOREIGN PATENT DOCUMENTS

WO    2004065208    8/2004

*Primary Examiner* — Naeem Taslim Alam
(74) *Attorney, Agent, or Firm* — FINNEGAN, HENDERSON, FARABOW, GARRETT & DUNNER LLP (57) ABSTRACT

In an embodiment, proprotor pitch ranges used during nominal cruise flight may be varied. By selecting ideal combinations of proprotor pitch angle and proprotor rpm, instead of the proprotor blade pitch bearing spending most of its time in a first range, multiple ranges may be alternated between. Additionally, in an aircraft with multiple proprotors, the portion of total thrust produced by each individual proprotor may be varied over time in order to allow for proprotor blade pitch angle to be varied without varying proprotor rpm. By properly cycling between different blade pitch ranges, bearing life can be significantly increased.

22 Claims, 10 Drawing Sheets

(51) Int. Cl.
    *B64C 29/00*     (2006.01)
    *B64D 27/24*     (2024.01)
    *B64D 45/00*     (2006.01)

(56) References Cited

U.S. PATENT DOCUMENTS

| | | |
|---|---|---|
| 2016/0059952 A1 | 3/2016 | Kvitnevskiy |
| 2016/0298691 A1* | 10/2016 | Dowie ................... F16C 7/06 |
| 2018/0079522 A1* | 3/2018 | El Haloui .............. B64D 45/00 |
| 2020/0056586 A1 | 2/2020 | Ehlers |
| 2020/0148347 A1* | 5/2020 | Bevirt ................. B64C 29/0033 |
| 2020/0271061 A1* | 8/2020 | Kopeschka ............. F02D 45/00 |
| 2020/0391860 A1* | 12/2020 | Foskey ................... B64C 27/24 |
| 2021/0291969 A1* | 9/2021 | Guntzer ................. B64C 27/26 |

\* cited by examiner

6002
Generate a first amount of forward thrust with a first set of proprotors at a first pitch and a first revolutions per minute for a first amount of time.

6003
Compute a second pitch and rpm setting using bearing history data, required thrust data, and proprotor efficiency data.

6004
Command the computed second proprotor pitch and rpm setting.

6005
Generate and store data related to the pitch bearing life.

6006
Generate and store data related to the bearing life.

7002
Generate a first amount of forward thrust with a first set of propellers at a first pitch and a first revolutions per minute for a first amount of time.

7003
Determine a trigger event has happened.

7004
Compute a second pitch and rpm setting using bearing history data, required thrust data, and propeller efficiency data.

7005
Command the computed second rotor pitch and rpm setting.

7006
Generate and store data related to the bearing life.

8002
Generate a first amount of forward thrust with a first set of propellers at a first pitch and a first rpm setting and a second set of propellers at a second pitch and a second rpm setting for a set amount of time.

8003
Determine an event has happened.

8004
Generate a first amount of forward thrust with a first set of propellers at a third pitch and a third rpm and a second set of propellers at a fourth pitch and a fourth rpm setting for a set amount of time wherein the third pitch setting is different than the first pitch setting and the fourth pitch setting is different than the second pitch setting.

8005
Record the amount of time the first set and second set of propellers have spent at different pitch settings.

8006
Compute an optimal combination of pitch settings for the first set of propellers and second set of propellers to generate a fixed amount of thrust while providing for an optimal component wear life.

AIRCRAFT COMPONENT LONGEVITY

PRIORITY CLAIM

This application claims priority to PCT/US21/43404 filed Jul. 3, 2922, which claims priority to U.S. provisional application having Ser. No. 63/057,613 (filed Jul. 28, 2020). These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is VTOL aircraft component longevity.

BACKGROUND

Metallic Ball bearings have known deficiencies when used for propeller or rotor blade feather axis bearings. Rotor or propeller blades often operate within a relatively small pitch angle envelope for most of their service life. The small range of angles for which the bearing operates results in dramatically shortened service life. Ball bearings are better suited for applications with consistent rotation and change in relative static position.

SUMMARY

In an embodiment, proprotor pitch ranges used during nominal cruise flight may be varied. By selecting ideal combinations of proprotor pitch angle and proprotor rpm, instead of the proprotor blade pitch bearing spending most of its time in a first range, multiple ranges may be alternated between. Additionally, in an aircraft with multiple proprotors, the portion of total thrust produced by each individual proprotor may be varied over time to allow for proprotor blade pitch angle to be varied without varying proprotor rpm. By properly cycling between different blade pitch ranges, bearing life can be significantly increased.

DETAILED DESCRIPTION

During the service life of an aircraft, aircraft proprotor blades may spend a large portion of their service life within a small pitch range. A propeller or rotor blade may spend all or most of its service life within a twenty-degree angular window. During different periods of operation, the pitch angles may be concentrated within an even smaller rotational window—for extended periods of time. These type of load cycles will over time wear the bearing out due to fretting—often causing pitting of the bearing races. The bearings will wear much more rapidly than if the bearing rotated continuously.

Changing controllable variables to increase component longevity can be an efficient way of increasing the economics and reliability of an aircraft. Implementing control laws that use life cycle information of components can increase component life expectancy.

One solution—to extending the expected life of feather axis bearings—is to implement a system configured to vary propeller pitch throughout the service life of the bearing. Propeller rpm and propeller pitch (and thus propeller advance ratio) may be varied to increase the life of the propeller pitch blade bearings.

Traditionally, the first degree of freedom of a propeller system is used to trim the aircraft and then the final degrees of freedom are used to attain peak efficiency. However, some embodiments herein intentionally set the propeller blades to a given pitch, and use the remaining degrees of freedom—such as rpm—to trim the aircraft for the desired aircraft speed. In some embodiments, a certain rpm may be commanded and the then pitch used to trim the aircraft. If different rpm's are commanded for approximately the same thrust requirements, the resulting pitch setting of the rotor blade—and thus pitch bearing—will be varied over time. Some embodiments may schedule rpm and pitch change to change in sync. While there may be some efficiency loss—the efficiency losses can be outweighed by the longevity benefits.

Figure 1:
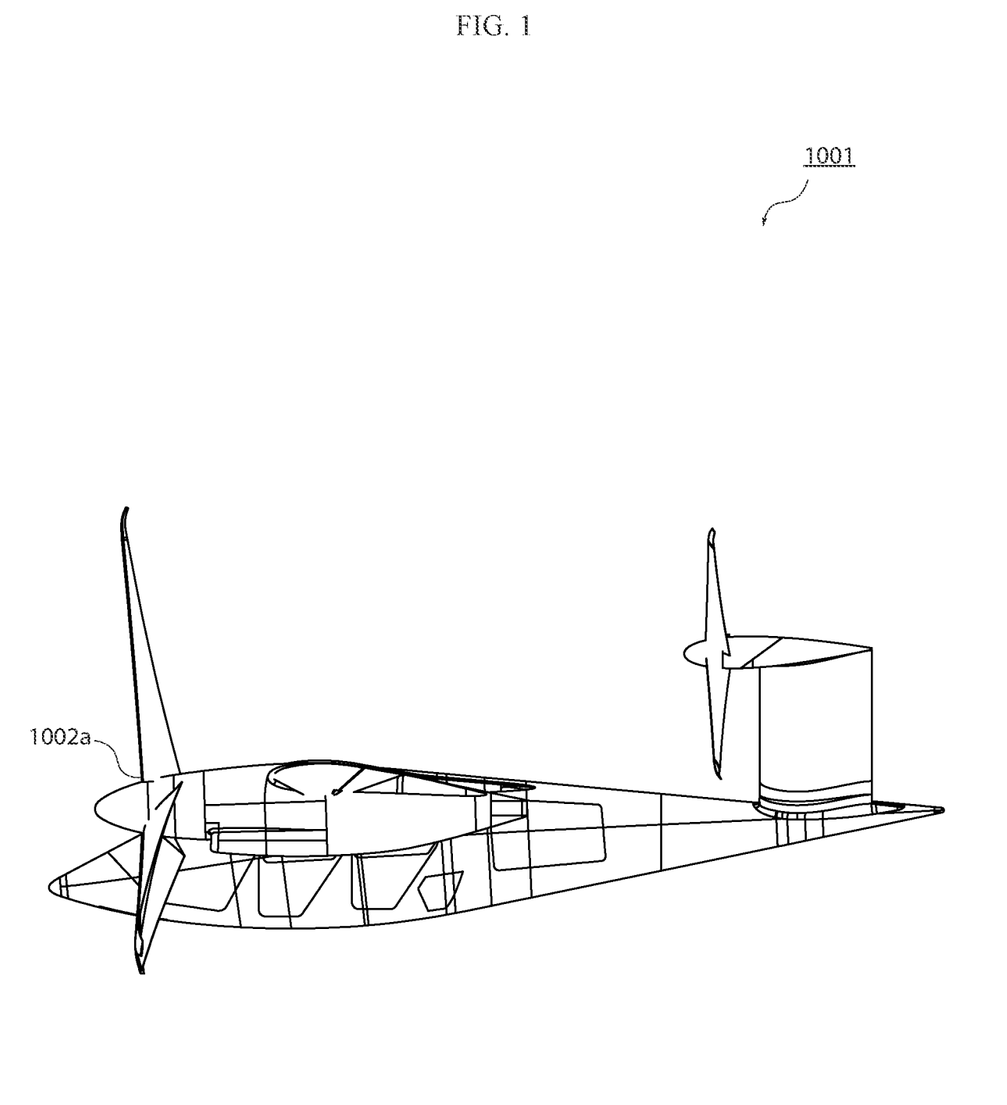
FIG. 1 illustrates a quad tiltrotor aircraft on which an embodiment may be beneficially implemented.

Shown in FIG. 1 is a quad tiltrotor aircraft 1001 that would be especially well suited for an implementation of aspects discussed herein. When the quad tiltrotor aircraft 1001 is in wingborne flight mode, a certain amount of drag is created by the aircraft—in order to maintain constant forward velocity. A certain amount of cumulative thrust is required to be generated by the confluence of propellers. Aircraft such as some of the aircraft discussed in U.S. Ser. No. 10/351,235B2 to Karem, incorporated hereby by reference in its entirety, and U.S. patent application Ser. No. 16/869,188 to Karem, incorporated hereby by reference in its entirety, may especially benefit from embodiments disclosed herein.

Figure 2:
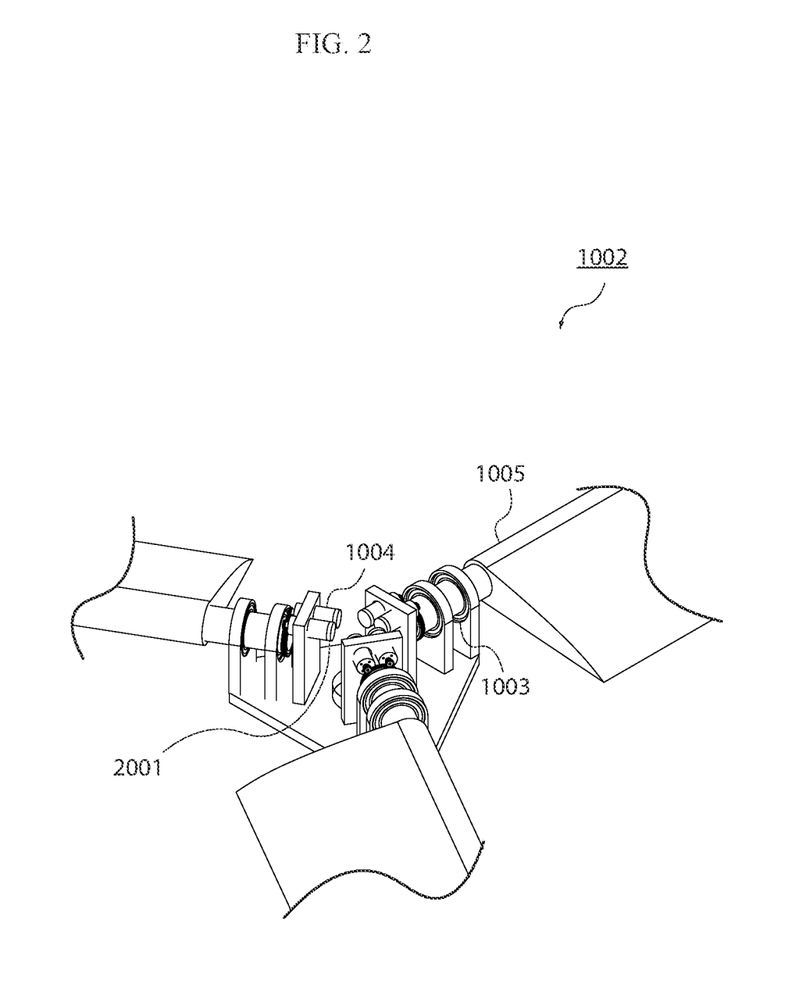
FIG. 2 illustrates a proprotor hub assembly.

FIG. 2 shows a proprotor assembly 1002 comprising blade pitch bearings 1003, blade pitch actuators 1004 and proprotor blades 1005. The bearings are ideally metallic ball bearings. However, in some embodiments the bearing may be any suitable bearing, including: ceramic ball bearings, bushing type bearings, or roller bearings.

It should be understood the proprotor pitch actuators 1004 may comprise any suitable proprotor blade pitch actuator including linkage type actuation systems, geared actuator systems, rotary actuator systems, linear actuator systems, or any combination of the aforementioned systems. The proprotor blades may be any suitable type of proprotor blade including composite proprotor blades. Especially preferred embodiments use proprotor blades such as the blades described in U.S. Pat. No. 6,641,365 B2 to Karem, incorporated hereby in its entirety by reference.

Figure 3:
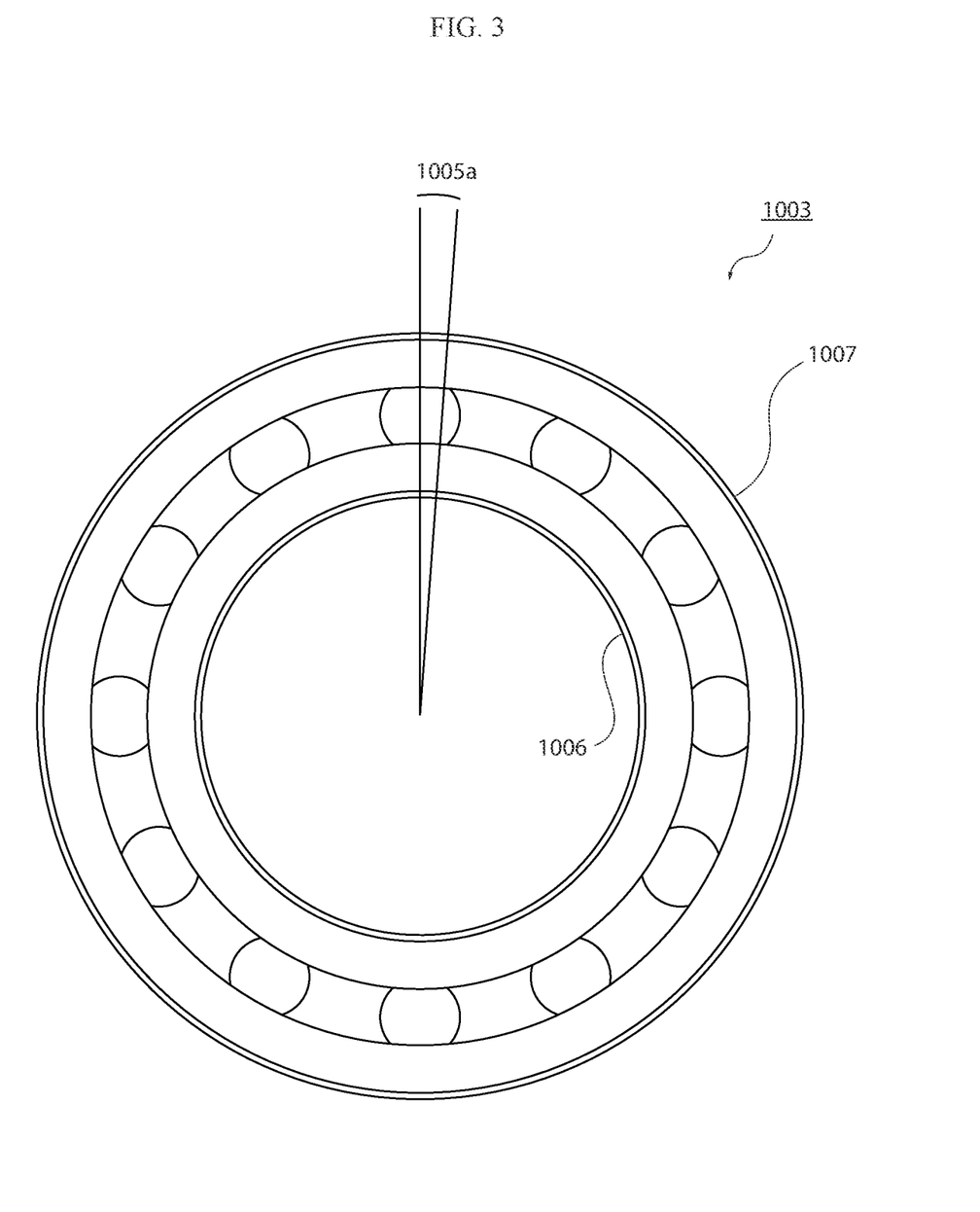
FIG. 3 illustrates a proprotor blade pitch bearing.

FIG. 3 shows blade pitch bearing 1003 and range 1005*a* which may represent the range of angles an inner bearing race 1006 of the bearing—and the attached proprotor blade assembly—may rotate through while maintaining nominal cruise flight. Blade pitch bearing 1003 comprises inner race 1006 and outer race 1007. Other bearing arrangements may be used. For example, some embodiments may use a feather axis bearing inside the proprotor root—in which case the outer race of the bearing would rotate with the proprotor blade.

Figure 4:
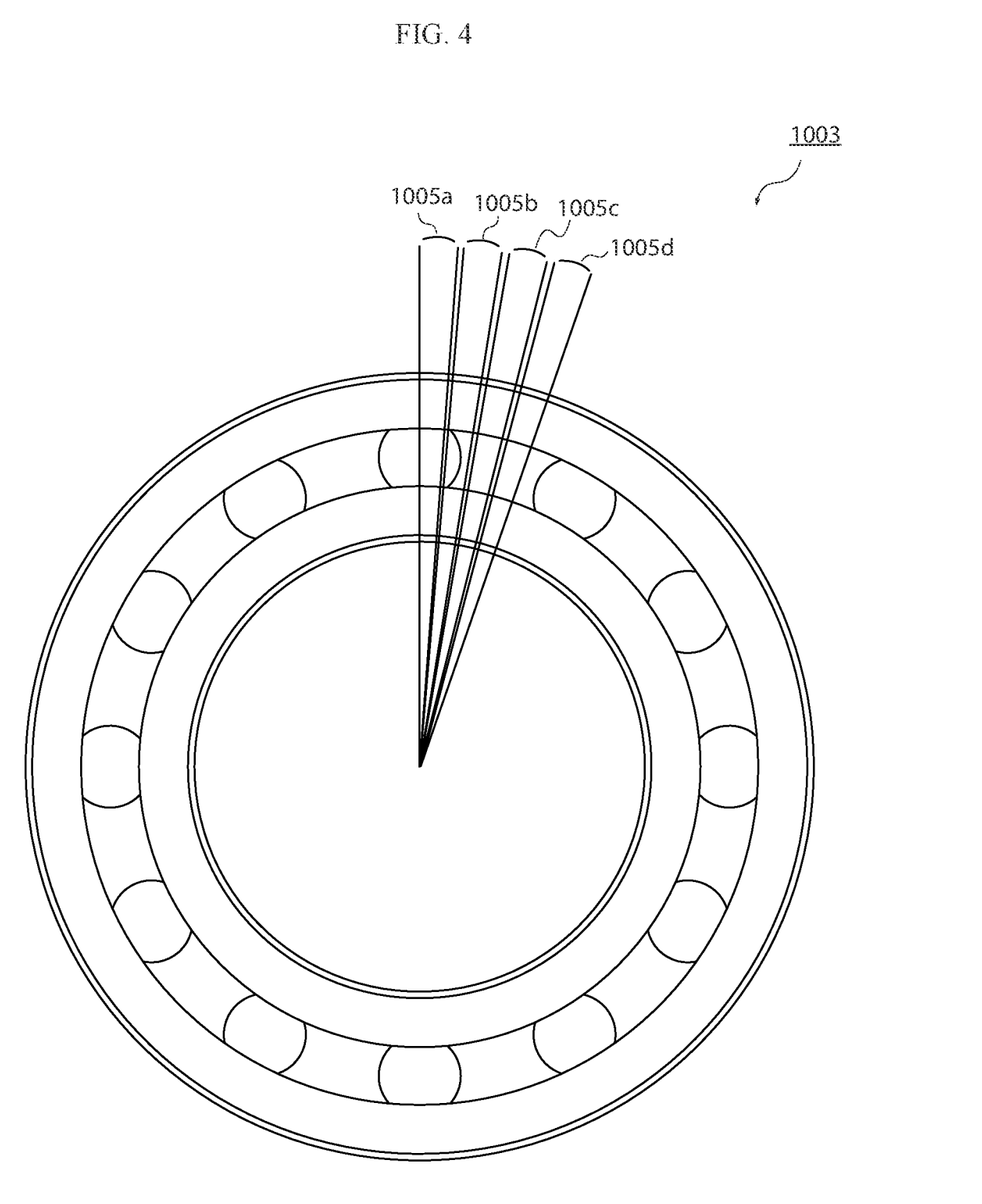
FIG. 4 illustrates a proprotor blade pitch bearing.

FIG. 4 shows multiple angular ranges 1005a, 1005b, 1005c, and 1005d through which the inner race—and the blade assembly fixed thereto—may rotate through. Angular range 1005a may correspond to a range of propeller pitch angles that a propeller would traditionally stay within while maintaining a certain forward cruise speed that is most ideal from a motor performance standpoint or from a propeller efficiency standpoint. By cycling through ranges 1005a, 1005b, 1005c, and 1005d, the life of bearing 1003 may be prolonged.

Any number of ranges may be used. Furthermore, some implementations may not use ranges at all, but rather expand the spectrum of angles through which a proprotor blade rotates during nominal cruise flight or other normal operating conditions.

Figure 5:
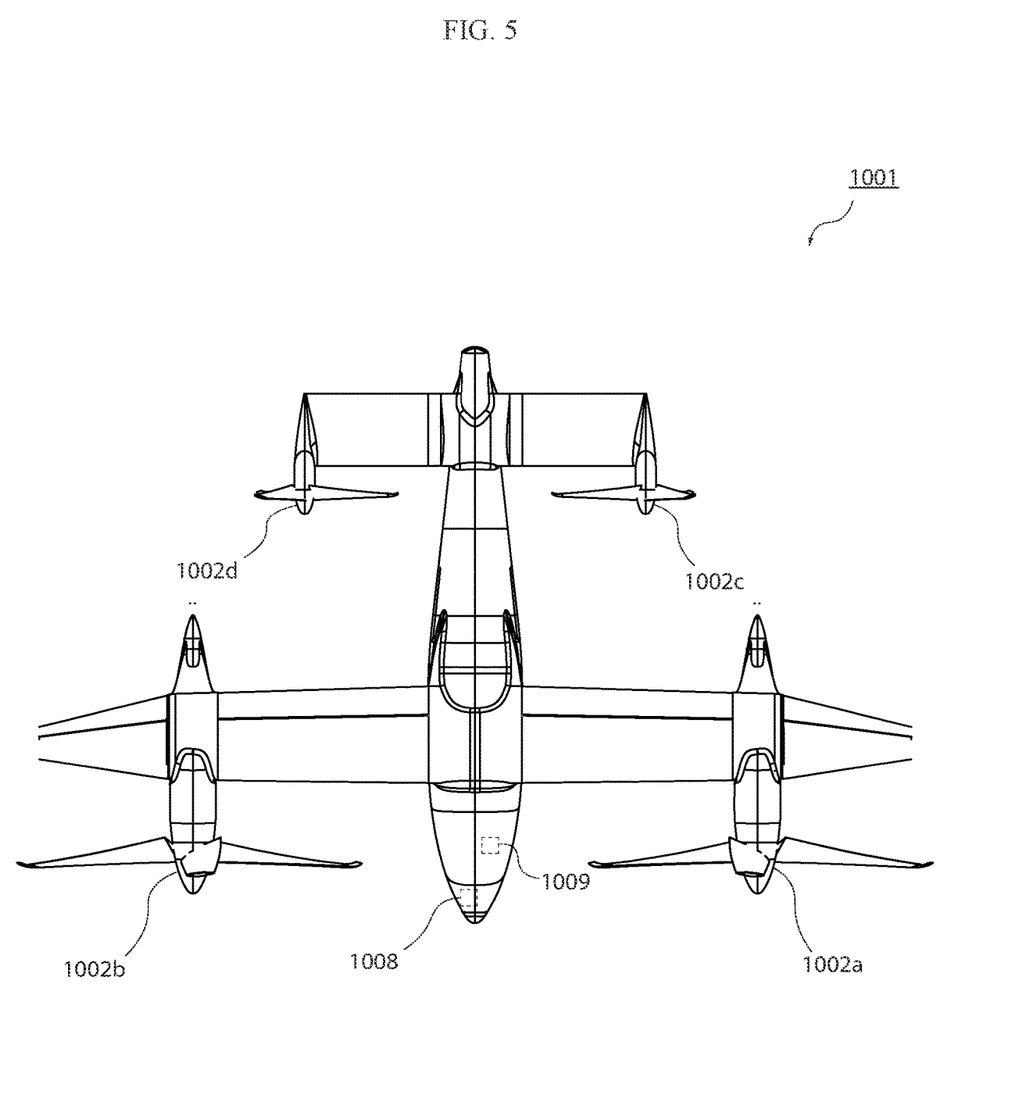
FIG. 5 illustrates a quad tiltrotor aircraft on which an embodiment may be beneficially implemented.

Shown in FIG. 5, aircraft 1001 may comprise an aircraft control system 1009 configured to command a net thrust from aircraft proprotor assembly 1002. There may be any number of aircraft proprotor assemblies 1002, but especially preferred embodiments will comprise 4 proprotor systems. Aircraft 1002 further comprises electronic flight control system 1008.

In one embodiment aircraft control system 1009 commands a first thrust from electronic flight control system 1008. The thrust command may have an associated thrust vector, for example directly forward. Electronic flight control system 1008 may command the first amount of thrust from the proprotors 1002 with a first combination of thrust and proprotor revolutions per minute (rpm).

Returning to FIG. 4, the proprotor pitch ranges used during nominal cruise flight may be varied. By selecting ideal combinations of proprotor pitch angle and proprotor rpm, the time a bearing spends in one pitch range can be varied. For example, instead of the proprotor bearing spending most of its time in range 1004a, ranges 1004b, 1004c, and 1004d may alternated between. Rotating amongst different pitch ranges can significantly extend the bearing life.

A given proprotor will have certain efficiency vs. advance ratio characteristics. For many proprotors—operating in propeller mode—there can be a fairly wide range of proprotor pitch angles which result in approximately equivalent efficiencies. Electronic flight control system 1008 may be configured to command combinations of pitch and rpm that result in optimal efficiency. In general, as the commanded pitch setting increases, the commanded rpm—and thus advance ratio—will increase as well to achieve the highest attainable efficiency at different pitch settings—for a given aircraft speed. For example, if a pitch of fifteen degrees is commanded, electronic flight control system 1008 will command a corresponding rpm that results in a certain advance ratio. If electronic flight control system 1008 commands a second pitch of 20 degrees, the corresponding commanded advance ratio—resulting from the commanded rpm—will increase.

There are several combinations of pitch settings and advance ratio settings that result in acceptable efficiency penalties relative to the peak efficiency of the proprotor. When a pitch is commanded, a corresponding advance ratio is selected and commanded as well by way of commanding a certain rpm. As the thrust may be affected by proprotor rpm and pitch setting, the electronic flight control system 1008 needs to select a combination of advance ratio and pitch setting that results in the commanded thrust.

In some embodiments, the aircraft control system 1009 may determine that optimal efficiency and component longevity is provided by periodically varying the speed of the aircraft. Optimal efficiency for a commanded proprotor pitch angle may result from slightly varying the amount of thrust which will inevitably lead to a change in aircraft velocity.

In one embodiment—such as the one shown in FIG. 2—rotor 1002 may comprise a sensor 2001 which may comprise a resolver, an encoder, or another known type of feedback sensor. The sensor 2001 sends a signal to the electronic flight control system, which may then use the signal to compute bearing history data. Alternatively, the back emf of the actuators may be used to generate a signal—the signal can then be used to calculate bearing history data. In some embodiments, information from sources such as bench tests may be referenced by the electronic flight control system.

Figure 6:
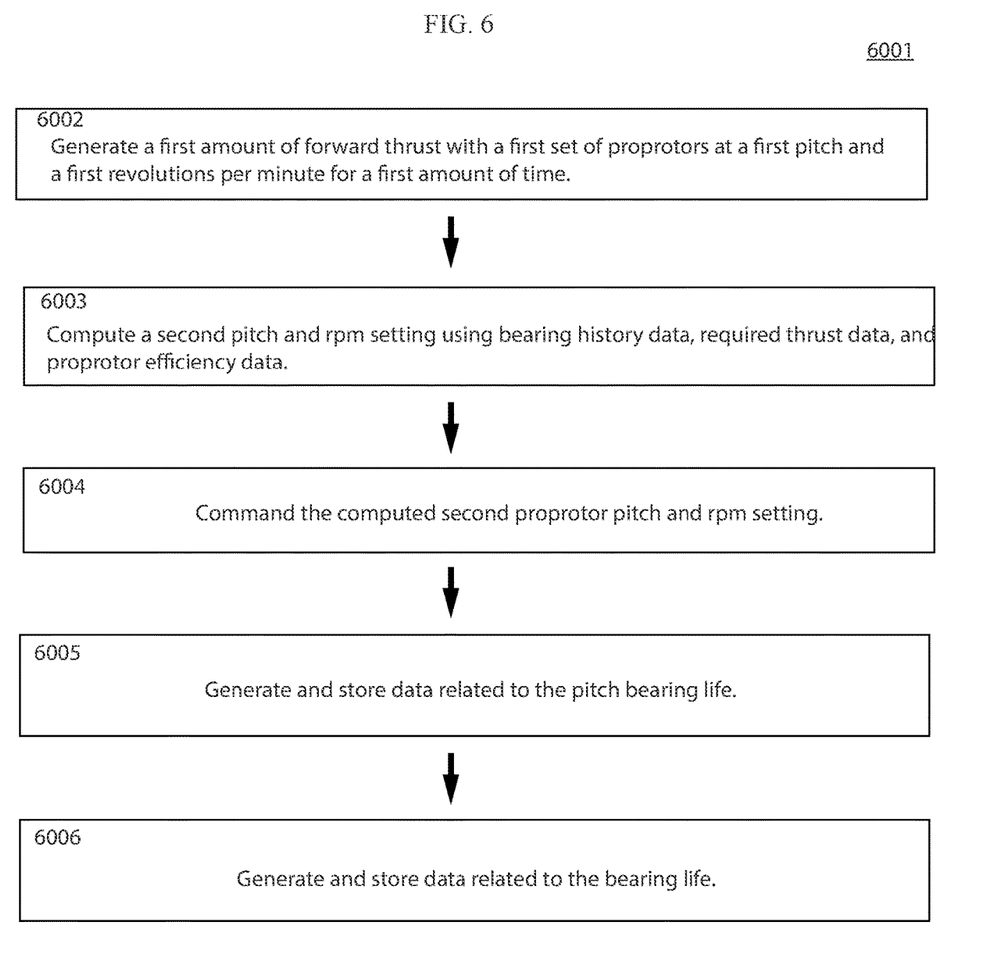
FIG. 6 illustrates a set of steps for increasing bearing life.

Electronic flight control system 1008 may be configured to carry out the steps of FIG. 6. The electronic flight control system 1008 may command the motors and proprotors to generate a first amount of forward thrust with a first set of proprotors at a first pitch and a first rpm for a first amount of time. The electronic flight control system 1008 may compute a second pitch and rpm setting using bearing history data, required thrust data and proprotor efficiency data. Using the computed second pitch and rpm setting, the electronic flight control system may command the computed second proprotor pitch and rpm setting of the proprotor and powertrain. The electronic flight control system 1008 may cause bearing history data to be generated and stored.

Bearing history data may comprise any data relevant to bearing wear including: the time one or more rotor blades—and thus the corresponding blade pitch bearing or bearings have spent within a particular angular range—either in an immediately preceding time window or over a certain amount of past time; loads acting upon one or more rotor blades; the number of pitch change cycles a rotor blade—and thus the corresponding bearing(s) has undergone; the angular range of blade pitch over a given time; the number of small magnitude pitch change cycles corresponding to specific angular regions of the overall blade pitch travel window; or a variable that serves as a proxy for bearing wear.

Figure 7:
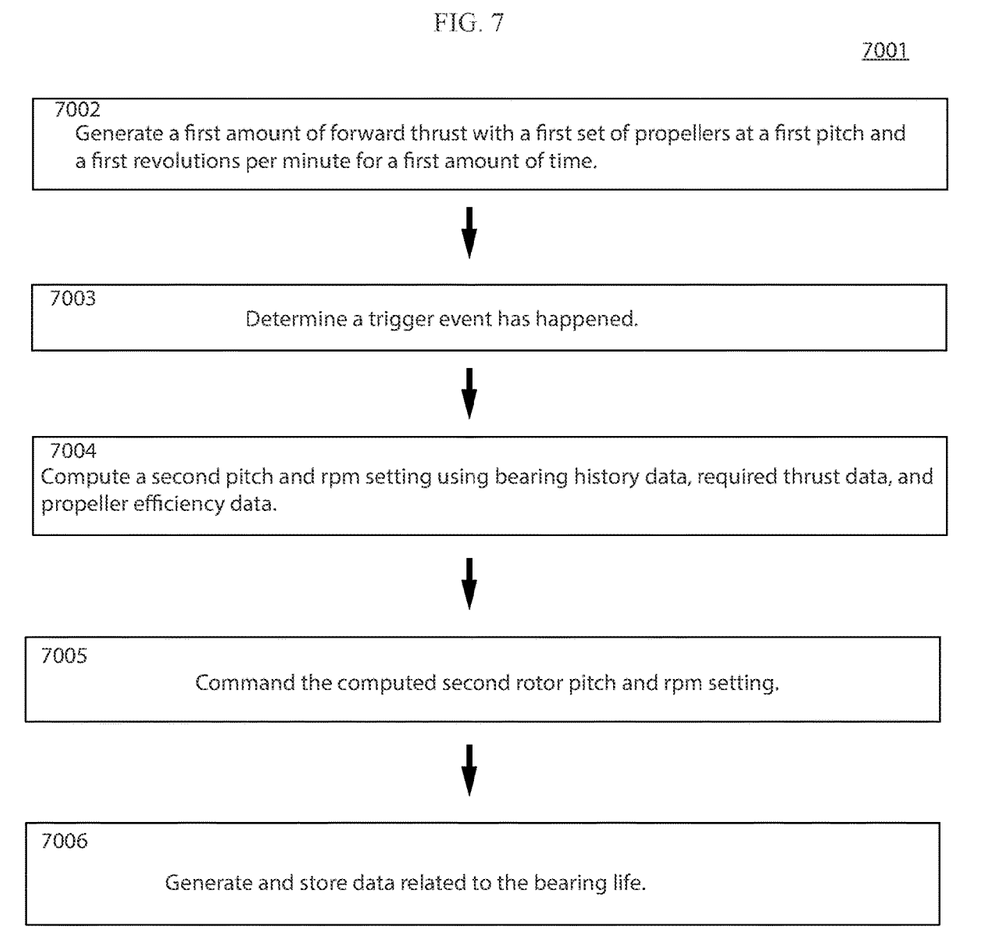
FIG. 7 illustrates a set of steps for increasing bearing life.

Electronic flight control system 1008 may be configured to implement the steps of FIG. 7. Electronic flight control system 1008 commands a first pitch and rpm from proprotors 1002 for a first amount of time. Electronic flight control system 1008 may then command a second pitch and rpm from proprotors 1002 which result in the same amount of thrust from each proprotor 1002. Electronic flight control system 1008 may generate and store data related to bearing life. The data may include information such as: the amount of time the bearing has spent within various pitch ranges 1005; the number of times the bearing 1003 has spent a prolonged amount of time at specific pitch angles; and loads sustained while the bearing was within particular pitch ranges.

Figure 8:
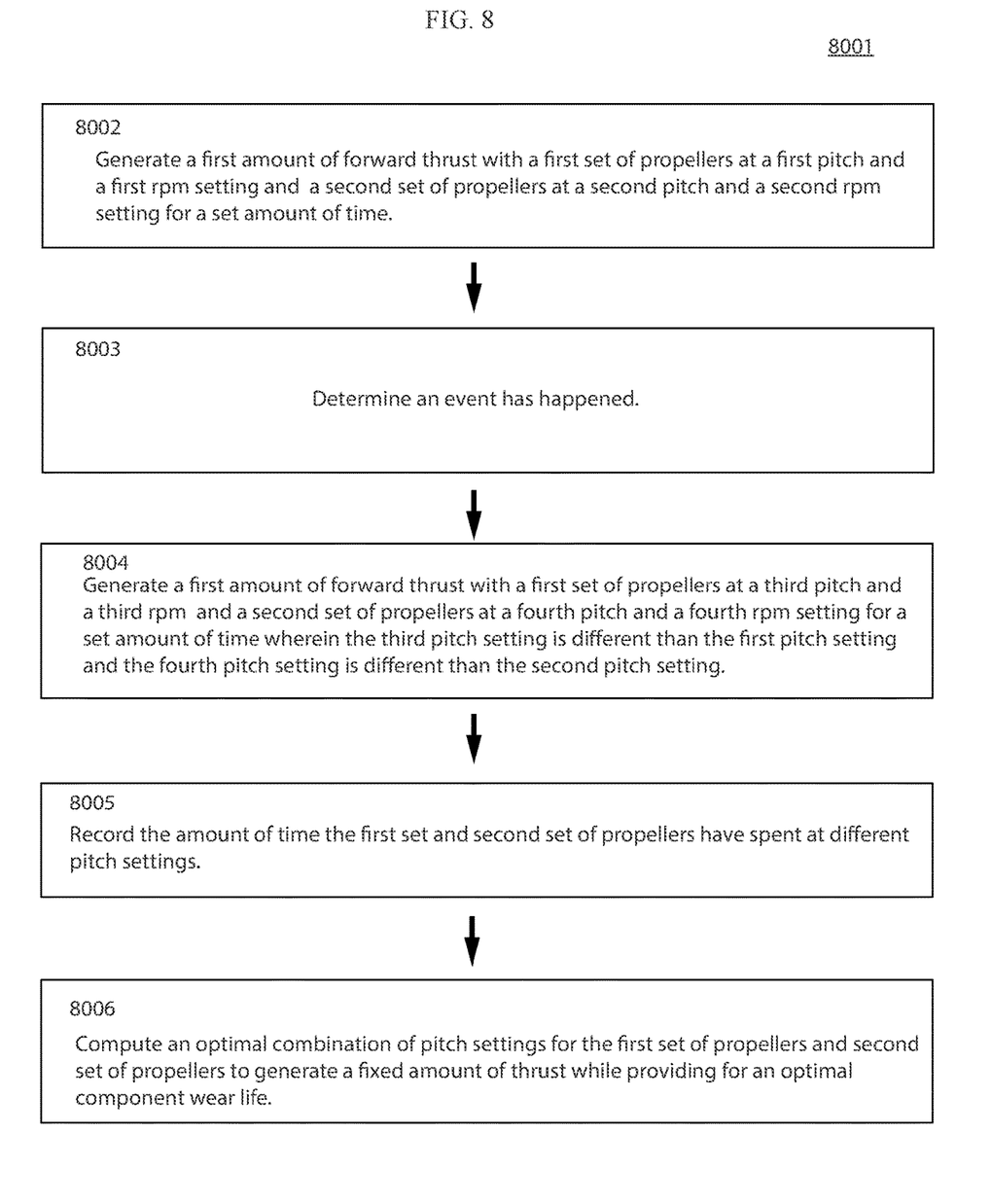
FIG. 8 illustrates a set of steps for increasing bearing life.

Electronic flight control system 1008 may be configured to implement the steps of FIG. 8. The electronic flight control system 1008 may generate a commanded thrust with a first set of propellers at a first rpm and pitch setting and a second set of propellers at a second pitch and a second rpm setting for a set amount of time.

For example, aircraft 1001 may generate 45% of thrust using the front pair of proprotors and 55% percent of the thrust using the rear pair of proprotors. The front pair of proprotors will have a commanded rpm and pitch setting. Likewise, the rear proprotors will have a commanded rpm and pitch setting.

The electronic pitch control system 1008 may then implement step 8003 of determining an event has happened. The event may comprise the passing of a certain amount of time that a proprotor blade has operated in a first range—for example, two minutes.

Executing step 8004, the electronic pitch control system generates the commanded amount of thrust using a second combination of thrust from the sets of proprotors. For example, the front pair of proprotors of aircraft 1001 may use a third pitch and advance ratio setting to generate a commanded thrust. And the rear pair of proprotors of aircraft 1001 may use a fourth advance ratio and pitch combination to generate a commanded thrust. For example, aircraft may generate 55% of the aircraft's required thrust using the front pair of proprotors and 45% of required thrust using the aft pair of proprotors.

Similar to the steps of flow chart 6001, the electronic pitch control system may store or cause to be stored information regarding lifetime pitch setting and other wear related information regarding the proprotor blade pitch bearings.

One benefit of the method discussed in FIG. 8 is to blend the thrust over multiple rotors in a varied manner. In doing so, the blade pitch setting for each specific rotor is averaged over a larger contact patch, and thus wear is not localized at a very specific pitch setting. Likewise, the methods of FIGS. 6 and 7 result in larger averaged contact patches for the blade pitch angle setting—thus reducing localized wear.

The electronic flight control system 1008 may use the information to compute optimal proprotor blade pitch, advance ratio, thrust distribution, and even aircraft speed to achieve the optimal combination of bearing life, propeller efficiency, and aircraft performance.

The method of 6001 is preferred to the method of 8001 for many applications because by increasing the thrust required from one set of propellers above what would normally be required, the bearing life will be shortened. However, in some applications the bearing life advantage gained from varying the pitch of the proprotors will be greater than the bearing life penalty resulting from increasing the proprotor load above nominal.

On the other hand, the method of 8001 may have an advantage in some passenger aircraft implementations because it can be implemented without significantly varying the proprotor rpms—which may be bothersome for passengers.

A combination of methods 7001 and 8001 may also be best suited for some applications.

Figure 9:
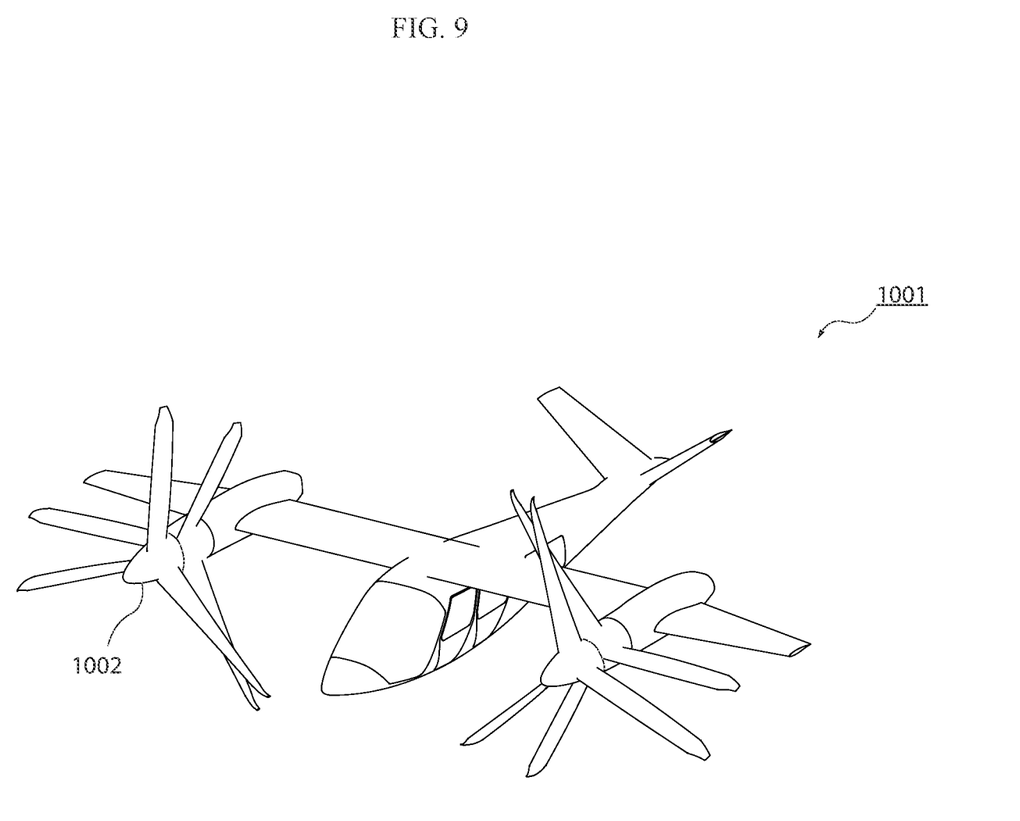
FIG. 9 illustrates an aircraft with coaxial proprotors on which embodiments described herein may be beneficially implemented.

Coaxial quad tiltrotor aircraft such as the aircraft shown in FIG. 9 can benefit from concepts described herein. Some embodiments can redistribute thrust between the top and bottom rotor in each rotor stack to extend component life.

Figure 10:
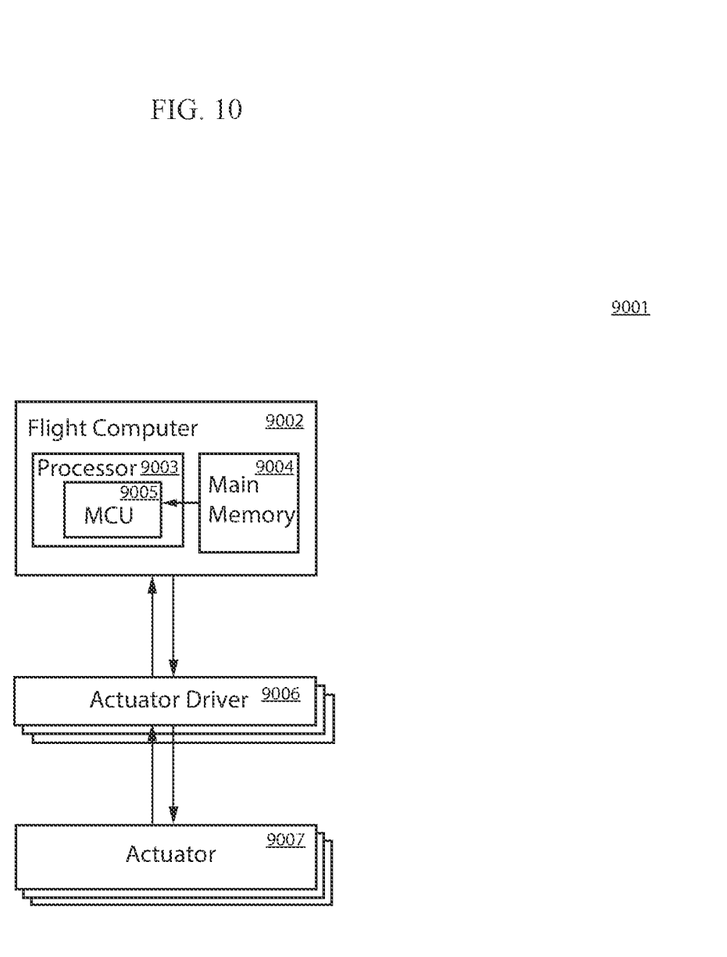
FIG. 10 illustrates hardware used for implementing an embodiment described herein.

FIG. 10 illustrates one embodiment of hardware that can be used to implement concepts described herein. In the embodiment of FIG. 10, electronic flight control system 1008 comprises flight computer 9002. Flight computer 9002 comprises processor 9003 and main memory 9004. Processor 9003 comprises MCU 9005. Flight computer 9002 is in communication with actuator drivers 9006 which are each in communication with respective actuators 9007.

Especially preferred embodiments of the current invention are configured for electric vertical takeoff and landing (eVTOL) aircraft. Such aircraft may have motor characteristics especially well-suited for implementation of aspects discussed herein because of the wide constant power spectrum of the motor and the ease of quick and precise rpm control. For some motors—especially non-electric motors—the efficiency of the motor at different rpm speeds should be taken into account when computing the ideal proprotor blade pitch and proprotor rpm to achieve the optimal balance of efficiency and component longevity. Furthermore, the speed and precision at which electric motor rpm can be changed is often quicker than equivalent fuel consuming engines.

Some embodiments may incorporate information from sensors including hub moment sensors and blade load sensors, vibration sensors, blade pitch moment sensors. Such information may be used by the electronic flight control system 1008.

Proprotor systems—especially optimal speed rotors—with individual blade control may be particularly well suited for implementation of embodiments of concepts discussed herein.

It should be understood that principles described herein may apply equally to propellers, proprotors, or rotors operating in VTOL flight mode as well as propellers operating in horizontal flight mode. While specific examples herein describe tiltrotor aircraft, it should be understood that the principles may apply equally to any aircraft—including helicopters and propeller airplanes.

It should be noted that any language directed to an electronic flight control system or aircraft control system should be read to include any suitable combination of computing devices, including servers, interfaces, systems, databases, agents, peers, engines, controllers, or other types of computing devices operating individually or collectively. The computing devices may comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed above with respect to the disclosed apparatus. In some embodiments, various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Furthermore, the aircraft controller may include any suitable combination of computing devices, including servers, interfaces, systems, databases, agents, peers, engines, controllers, or other types of computing devices operating individually or collectively.

Aspects of the electronic flight control system may be located somewhere on the aircraft on which the proprotor is located or anywhere else including in a ground-based control center, on other aircraft, or even in components of the proprotor itself. Furthermore, in some embodiments the aircraft controller and the electronic flight control system and the aircraft control system may be implemented in distinguishable units or may be combined in one unit.

Any reference to a range of values should be understood to include each individual value within that range.

The aircraft control system may include inputs for human pilots to control various aircraft dynamics.

It should be recognized that concepts taught herein can equally apply to propellers, rotors or proprotors whether used in a helicopter, airplane, or tiltrotor aircraft. The term proprotor should be understood to encompass rotor, propeller, and proprotor. Additionally, rotor blade should be understood to encompass rotor blade, propeller blade, and proprotor blade.

The invention claimed is:

1. A VTOL aircraft comprising:
a wing;
a proprotor carried by the wing, and comprising a first proprotor blade;
a first proprotor blade pitch actuator; and
an electronic flight control system configured to compute, using pitch axis bearing history data, a first pitch of the first proprotor blade, and wherein the electronic flight control system is configured to command the first proprotor blade pitch actuator to move the proprotor blade to the computed first pitch.

2. The aircraft of claim 1 wherein the bearing history data comprises a measurement of time the proprotor blade has been within a first pitch angle range.

3. The aircraft of claim 1 wherein the electronic flight control system is configured to command an equal amount of thrust when the first proprotor blade is at a first pitch and when the first proprotor blade is at a second pitch.

4. The aircraft of claim 1 wherein the electronic flight control system is configured to command a change in rotations per minute (rpm) of the proprotor contemporaneous to commanding a pitch change of the first proprotor blade.

5. The aircraft of claim 4 wherein the electronic flight control system is configured to compute a combination of pitch of the first proprotor blade and rpm of the proprotor using propeller efficiency data.

6. The aircraft of claim 5 wherein the efficiency data comprises propeller efficiency versus rpm and advance ratio data.

7. The aircraft of claim 1 wherein the aircraft is an electric vertical takeoff and landing aircraft.

8. The aircraft of claim 1 wherein the proprotor is a rigid proprotor.

9. The aircraft of claim 1 wherein the aircraft is a tiltrotor aircraft.

10. The aircraft of claim 9, wherein the tiltrotor aircraft is a quad-tiltrotor aircraft.

11. The aircraft of claim 1 wherein the electronic flight control system is configured to compute the first pitch of the first proprotor blade using proprotor pitch bearing history data when the aircraft is in wingborne cruise flight.

12. A method for controlling a VTOL aircraft comprising a wing-mounted proprotor having a proprotor blade, the method comprising the steps of:
during nominal cruise flight, commanding a proprotor blade pitch actuator to move a proprotor blade to a first pitch angle;
computing, using proprotor blade pitch bearing history data, a second pitch angle of a proprotor blade; and
commanding the proprotor blade pitch actuator to move the proprotor blade to the computed second pitch angle.

13. The method of claim 12 wherein the bearing history data is a measurement of time the proprotor blade has been within a first pitch angle range.

14. The method of claim 12 further comprising the step of commanding an equal amount of thrust when the first proprotor blade is at a first pitch and when the first proprotor blade is at a second pitch.

15. The method of claim 14 wherein the commanding an equal amount of thrust comprises commanding a change in rotations per minute of the wing-mounted proprotor.

16. The method of claim 12 further comprising the step of commanding a change in rotations per minute of the proprotor contemporaneous to commanding a pitch change of the first proprotor blade.

17. The method of claim 16 further comprising computing a combination of pitch of the first proprotor blade and proprotor rpm using propeller efficiency data.

18. The method of claim 17 wherein the efficiency data comprises propeller efficiency versus rpm and advance ratio data.

19. The method of claim 12 wherein the wing-mounted proprotor is a rigid proprotor.

20. The method of claim 12 wherein the step of computing the second pitch angle of the wing-mounted proprotor occurs while the aircraft is in wingborne cruise flight.

21. A method of preventing proprotor pitch axis bearing degradation in a VTOL aircraft, the method comprising the steps of generating a first amount of thrust with a set of proprotors, changing the pitch angle of at least two of the proprotors of the set such that a total thrust of the set is the same but a portion of total thrust generated by each proprotor of the set is different than before the change of the pitch angle of the at least two of the proprotors of the set.

22. A VTOL aircraft comprising:
a wing-borne proprotor comprising a first proprotor blade;
a first proprotor blade pitch actuator;
an electronic flight control system configured to compute, using aircraft life data, a first pitch of the first proprotor blade, and wherein the electronic flight control system is configured to command the first proprotor blade pitch actuator to move the proprotor blade to the computed pitch.

* * * * *